United States Patent Office 3,259,221
Patented July 5, 1966

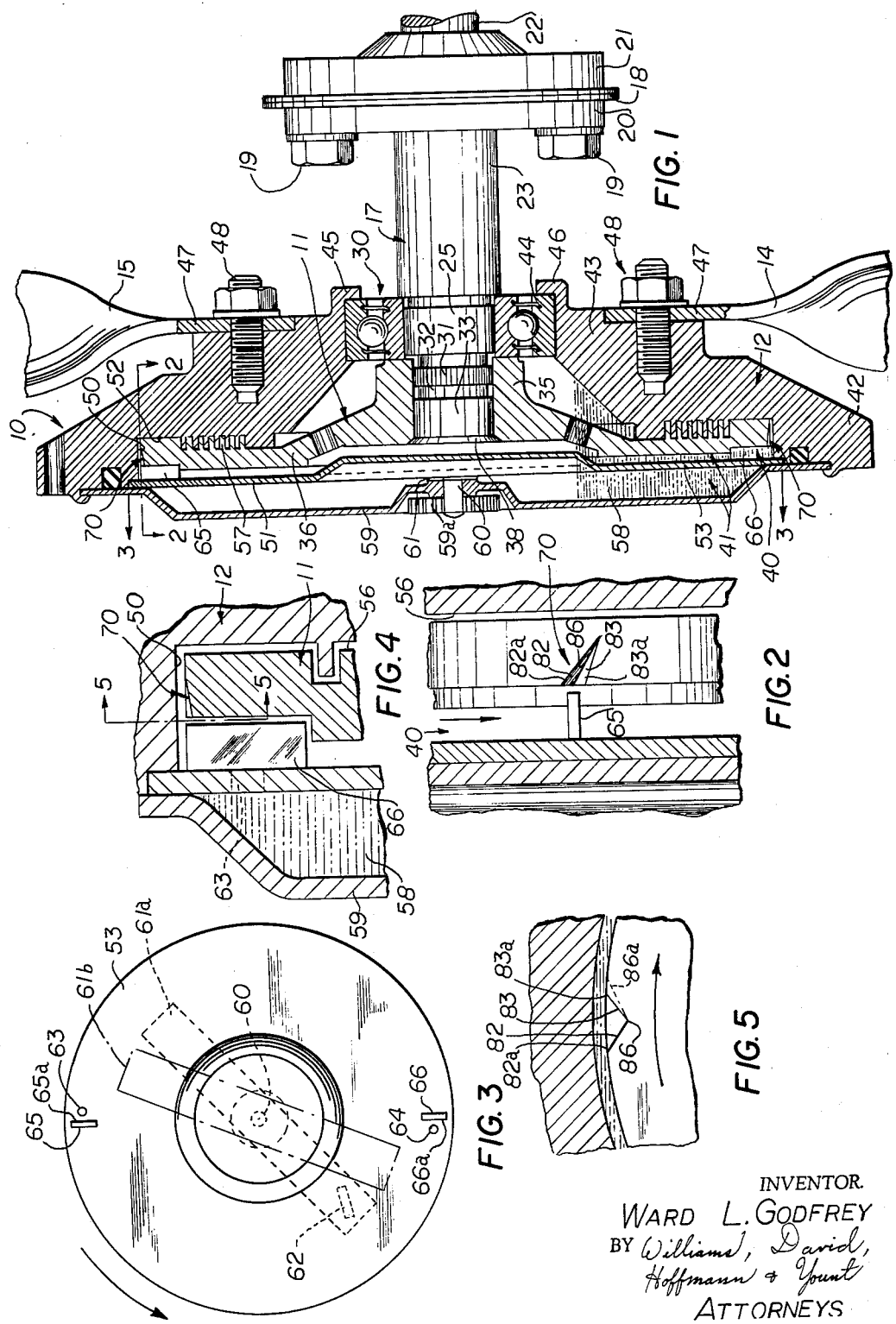

3,259,221
VISCOUS COUPLING
Ward L. Godfrey, Bellevue, Mich., assignor to Eaton Manufacturing Company, Cleveland, Ohio, a corporation of Ohio
Filed Mar. 2, 1964, Ser. No. 348,546
9 Claims. (Cl. 192—58)

The present invention relates to a drive coupling of the type embodying a fluid medium transmitting torque between relatively rotatable input and output coupling members and particularly, of the type of fluid coupling wherein a viscous shear fluid medium, such as silicone fluid, transmits torque between the rotatable coupling members.

The principal object of the present invention is the provision of a new and improved drive coupling of the fluid shear type which is simple in construction, easily manufactured, and operable to retard acceleration of the output coupling member upon acceleration of the input coupling member without greatly affecting the idle speed of the output coupling member.

A further object of the present invention is the provision of a new and improved simple viscous fluid coupling of the shear type wherein acceleration of the output coupling member is delayed or retarded upon acceleration of the input coupling member through the provision of pumping notch means formed on the periphery of the input coupling member which are operable to delay the flow of fluid into the shear space and, yet, which do not greatly affect the output idle speed of the coupling.

Another object of the present invention is the provision of a new and improved fluid coupling of the shear type including an input coupling member rotatable in a fluid chamber defined by an output coupling member and wherein the input coupling member includes a plurality of notches formed in the outer periphery thereof and extending through a portion of the axial length thereof and intersecting one axial face of the input coupling member only.

Still another object of the present invention is the provision of a new and improved fluid coupling as noted in the next preceding paragraph wherein the notch means is triangular in shape and is defined by surfaces which converge as they extend from the one axial face toward the shear space located on the side of the output coupling member remote from the one axial face.

Further objects and advantages of the present invention will be apparent to those skilled in the art to which it relates from the following description thereof made with reference to the accompanying drawings forming a part of this specification and in which:

FIG. 1 is vertical axial sectional view of a fluid coupling embodying the present invention;

FIG. 2 is a fragmentary, cross-sectional view of the fluid coupling shown in FIG. 1 taken approximately along the section line 2—2 thereof;

FIG. 3 is a sectional view of the fluid coupling shown in FIG. 1 and taken approximately along the section line 3—3 thereof;

FIG. 4 is an enlarged fragmentary sectional view of a portion of the fluid coupling shown in FIG. 1; and FIG. 5 is a fragmentary sectional view of a portion of the fluid coupling shown in FIG. 4 taken approximately along the section line 5—5 of FIG. 4.

The present invention provides a new and improved fluid coupling of the type including relatively rotatable coupling members having a fluid shear space therebetween and which are cooperable with a fluid shear medium in the shear space to provide a shear type fluid drive therebetween. Fluid couplings of this type may be used for driving various different kinds of load devices but have their primary use in driving vehicle engine accessories. The preferred embodiment of the present invention is shown in the drawings as forming a drive for a cooling fan accessory device of an internal combustion engine, not shown.

The preferred embodiment of the present invention is illustrated as a fluid coupling device 10. The coupling 10 includes an input coupling member 11, an output coupling member 12 and cooling fan blades 14 and 15 which are driven from the engine through the fluid coupling 10. The fluid coupling 10 also includes an input shaft member 17 on which the input coupling member 11 is mounted and which is rotatable as by a belt drive including a pulley member 18, only a portion of which is shown on the drawings. The pulley member 18 is preferably connected to the input shaft 17 at one end thereof by suitable screws 19 which extend through flange portion 20 on the end of the shaft member 17 and through openings in the pulley member. The screws 19 are threaded into hub plate 21 located on the side of the pulley 18 opposite from the flange portion 20 and are effective to clamp the pulley between the flange portion 20 and the hub plate 21. The hub plate 21 has a central opening therethrough which communicates with an opening or passageway in the flange portion 20, which openings receive a stub shaft member 22 which is rotatably supported by the engine block and supports the coupling.

The input shaft member 17 has, intermediate its ends and adjacent flange portion 20, an axially extending portion 23. The member 17 also has a reduced shaft portion 25 connected to the shaft portion 23 and functioning as a support for the inner race of a ball bearing assembly 30. Another shaft portion 31 is provided with surface serrations and a reduced diameter portion 32 connects the shaft portion 31 which a further shaft portion 33 at the end of the shaft 17 opposite the end having the flange portion 20.

The rotatable input or driving member 11 of the fluid coupling 10 is in the form of a disk having a hub portion 35 supported by the shaft 17. The hub portion 35 has an opening therethrough which has an interference fit with the shaft portions 31 and 33. The hub portion 35 is pressed onto the shaft until the inner surface of the hub portion 35 abuts the side of the inner race of the ball bearing assembly 30, and thus prevents movement of the ball bearing assembly 30 to the left as viewed in FIG. 1. The outboard end of the shaft 17 is balled over or flared at 38 to positively retain the coupling member 11 on the shaft member 17. The input member 11 further includes a radially extending portion 36 connected to the hub portion 35. From the above description, it should be apparent that rotation of the shaft 17 causes the input coupling member 11 to be rotated.

The input coupling member 11 rotates in a fluid working or operating chamber 40 forming a part of a fluid chamber means 41 formed by the rotatable output or driven coupling member 12. The output coupling member 12 is in the form of a housing and includes a main housing member 42 having a hub portion 43 with an opening 44 therethrough. The opening 44 has an interference fit with the outer race of the ball bearing assembly 30 and is supported thereby for rotation about the axis of the shaft 17. A flange portion 45 engages the right side of the outer race of the ball bearing assembly 30, as viewed in FIG. 1, and restrains housing member 42 from movement in one axial direction. Preferably, the outer race of the ball bearing assembly 30 is restrained from movement in the opposite axial direction by a rolled-over portion 46 of the housing member 42. The fan blades 14 and 15 are secured to surface portions 47 of the housing member 42 by stud and nut assemblies 48 so as to rotate with the housing member 42. The housing member 42 also includes a plurality of fin members located on the outer surface of the housing member 42 and functioning to cool the coupling 10.

The working chamber 40 formed by the output member 12 is defined by a cylindrical surface 50 coaxial with the shaft 17 and by end surfaces 51 and 52. The cylindrical surface 50 is provided by a bore in the housing member 42 and the end surface 52 is located at the bottom of the bore. The end surface 51 is provided by a partition member 53 in the form of a disk which extends transversely of the shaft 17 and the peripheral edge of which is secured to the housing member 42.

The input member 11 which rotates in the working chamber 40 has a surface portion spaced from the surface 52 of the housing member 42, defining a shear space 56 therebetween. The shear space 56 is defined by a plurality of axially extending cooperating grooves and lands on the surface 52 and the facing side of the input member, which are designated generally 57. The grooves and lands 57 provide opposed surfaces extending in close parallel face-to-face relation and define a part of the intervening shear space 56 which lies on one axial side of the input member and extends from the outer periphery of the input member. Upon rotation of the disk 11, fluid in the fluid operating chamber 40 transmits torque from the disk 11 to the housing member 42, and specifically silicone fluid in the shear space transmits torque between the adjacent surfaces of the input and output members by the shear action of the silicone fluid.

The amount of torque transmitted from the input member 11 to the output member 12 is a function of the volume and viscosity of the fluid in the chamber 40 and specifically in the above-mentioned shear space 56. The fluid coupling 10 preferably includes a means for varying the volume of fluid in the shear space 56 so as to vary the torque transmitted. Any conventional and known structural arrangement may be provided for varying the volume of the fluid and the specific structure involved will not be described herein in great detail.

Generally, however, the fluid chamber means 41 includes a reservoir chamber 58 communicating with the operating chamber 40. The reservoir chamber 58 is defined by a disk-shaped cover 59 secured to the housing 42. Means is provided for effecting fluid flow from the reservoir chamber 59 to the operating chamber 40 to increase the volume of fluid therein and from the operating chamber 40 to the reservoir chamber 58 to decrease the volume of fluid in the operating chamber. United States Patent No. 3,055,473 shows and describes a specific structure for providing the fluid flow between the reservoir chamber 58 and the working chamber 40, which structure may be incorporated herein.

The flow into and out of the working or operating chamber 40 is controlled by a helically wound, bimetallic temperature-responsive coil 59a. One end of the helically wound, bimetallic temperature-responsive coil is retained in position on the cover 59 and the other end is positioned in a slot formed in a stub shaft 60 rotatably supported by the cover member 59 coaxial with shaft 17. One end of the shaft 60 extends into the reservoir chamber 58, and the other end of the stub shaft 60 receives the end of the bimetallic coil and is pinched together so as to hold the end of helically wound coil onto the stub shaft. An arm member 61 is suitably secured to the end of the stub shaft 60 which extends into the reservoir chamber 58 for rotation therewith. The arm member 61 extends sufficiently to cover an opening 62 in the partition member, which opening communicates chambers 58 and 40. The arm member 61 is moved upon changes in temperature between its dash-dash position 61a covering opening 62 and its dash-dash position 61b wherein it does not cover opening 62, as shown in FIG. 3.

The coil 59a expands or contracts upon changes in temperature, depending upon whether there is an increase or decrease in the temperature. When the coil expands or contracts, it rotates the shaft 60 and also rotates the arm member 61 between its positions 61a, 61b. Upon a temperature increase, the coil 59a expands and causes rotation of the member 61 to its position 61b, in which position arm member 61 does not cover or block opening 62 in the partition member. Upon a reduction in temperature, the coil 59a contracts and the arm member 61 is moved thereby to its position 61a. When arm member 61 is in the position 61a, it blocks the flow of fluid through opening 62. When the arm member is in position 61b, it allows for the flow of fluid through the opening 62 in the partition member 53, and fluid then flows from the reservoir chamber 58 into the working chamber 40 due to the centrifugal head or pressure of the fluid in the reservoir chamber. At intermediate positions of the arm member 61, a certain amount of fluid flows into the working chamber 40 due to the centrifugal head depending upon the amount of opening 62 that is unblocked. When fluid flows into the operating chamber, there is an increase of fluid therein until an equilibrium condition is attained between the fluid chambers.

Fluid flow is effected from the working chamber 40 into the reservoir chamber 58 through the fluid passageways 63, 64 in the cover member by a pair of pumping or impact elements 65, 66, respectively, supported by and formed integrally with the partition member 53. The pumping elements 65, 66 project into the working chamber 40 on the axial side of the input member opposite the shear space 57 and are positioned in the working chamber radially outwardly of the interfitting lands and grooves 56 and are diametrically opposed. The fluid conducting passageways 63, 64 open into the working chamber 40 adjacent to the pumping elements 65, 66, respectively. The passageways 63, 64 are spaced circumferentially from the pumping elements 65, 66, respectively, so as to trail the pumping elements 65, 66, respectively, upon rotation of the coupling members. The direction of rotation of the input and output coupling members is indicated by the arrows in the drawings.

The input member 11 being the driving member, rotates at a speed faster than the speed of the output member 12 and thus causes fluid to be impacted against the axially extending surfaces 65a, 66a of the pumping elements 65, 66. This causes a pressure to build up adjacent the surfaces 65a, 66a, which pressure is directed by the passageways 63, 64, respectively, into the reservoir chamber 58.

Fluid continually flows through passages 63, 64 by the above-described action of the pumping elements 65, 66, and in the event the opening 62 is covered by the arm member 61, fluid does not flow into the working chamber 40 and thus there is a decrease in the amount of fluid in the working chamber 40 and an increase in the speed differential between the input and output members. However, in the event that the opening 62 is opened, fluid flows therethrough into the working chamber 61 at a faster rate than it flows through the passages 63, 64 into the reservoir chamber, and therefore there is a net increase in the volume of fluid in the working chamber 61 and a decrease in the speed differential between the input and output members. As noted above, the fluid in the working chamber increases until equilibrium is attained wherein flow into and out of the working chamber is substantially equal.

According to the present invention, the fluid coupling 10 is operable to retard acceleration of the output coupling member upon acceleration of the input coupling member without affecting the idle speed of the output coupling member. The fluid coupling 10 includes a means for pumping fluid from the fluid shear space 56 on one axial side of the input member to the opposite side thereof under certain operating conditions, as will be described hereinbelow. More specifically, notch means is formed on the outer periphery of the input member.

The notch means comprises pumping notches 70 which are positioned at circumferentially spaced locations around the outer periphery of the input coupling member and a plurality of the notches is provided therein.

The notches 70 each are a V-shaped notch positioned circumferentially around the outer periphery of the input coupling member 11. Each of the notches is defined by a pair of surfaces 82 and 83 which extend at an angle from the periphery of the input coupling member and downwardly into the coupling member. The surface 82 intersects the periphery of the input coupling member to provide an edge 82a and a surface 83 of the notch intersects the outer periphery of the input coupling member to provide an edge 83a. The notches do not extend entirely across the outer periphery of the input coupling member but rather extend from and intersect the axial face of the input coupling member remote from the lands and grooves 57 and terminate intermediate the axial side of the input coupling member. The surfaces 82 and 83 meet at the apex or base 86 of the notch and define the edge 86a which slants upwardly from the axial face of the input coupling member adjacent the partition member so that the depth of the notch as measured radially of the input coupling member decreases as the notch extends from the axial face of the input coupling member adjacent the partition member 53 toward the center of the input coupling member. Moreover, the circumferential extent of the notches decreases as they extend toward the shear space, and specifically the surfaces 82, 83 converge as they extend toward the shear space.

As shown in FIG. 5, the edge of the notch 86a extends at an angle to the direction of rotation of the input coupling member and the notch in general extends at an angle so the direction of rotation of the input coupling member. Accordingly, the notch functions to pump fluid from the shear space 57 to the opposite side of the input coupling member and also functions to retard fluid flow into the shear space. It is believed that in this manner, the notches function to retard acceleration of the output coupling member. As noted above, for any given position of the arm member 61, a given level of fluid in the shear space 56 and operating chamber is achieved. In such an equilibrium condition, if the input member is accelerated, the centrifugal head or pressure of the fluid in the operating chamber is increased and the pumping notches 70 rotated at increased speed. The pumping notches due to the increased speed thereof function to pump fluid from the shear space 56 to the opposite axial side of the input coupling member. This pumping action and the increase in centrifugal head in the operating chamber causes fluid to flow from the operating chamber. In this manner, the pumping notches 70 reduces the amount of fluid in the shear space 56 and thereby reduces the transmission of torque to the output coupling member, and this retards or delays acceleration of the output coupling which does accelerate but at a slower rate than the input member. Thus, any noise due to acceleration will lag behind engine noise. As the output member accelerates, the centrifugal force in the reservoir chamber is increased and fluid may flow back into the operating chamber or shear space and equilibrium will again be achieved.

In the event that the fluid coupling is in a non equilibrium condition as when actuated so as to effect transmission of silicone fluid from the reservoir chamber into the operating chamber and the input coupling member is accelerated, the pumping notches 70, to a certain extent, retard fluid flow into the shear space 56 and as a result, retard or delay acceleration of the output member. Since the notches 70 terminate intermediate the axial sides of the coupling member and have the configuration described above and are of a small size, they do not affect to any great extent the idle speed of the coupling member and thus may be utilized where acceleration of the output member is to lag behind acceleration of the input coupling member and thus be retarded, but where the idle speed of the output coupling member is not to be substantially varied.

The above description of the preferred embodiment of the present invention has been made in considerable detail and it should be understood that certain modifications, changes, and adaptations therein may be made by those skilled in the art to which it relates and it is hereby intended to cover all such modifications, changes, and adaptations which fall within the scope of the appended claims.

Having described my invention, I claim:

1. A fluid coupling of the shear type comprising a first coupling member defining a fluid working chamber, a second coupling member rotatable in the fluid working chamber, said second coupling member having fluid working chamber portions on the opposite axial sides thereof, one of said working chamber portions being defined by opposed spaced surfaces on said first and second coupling members and providing a fluid shear space therebetween, said opposed spaced surfaces being cooperable with the fluid shear medium in the shear space to transmit torque between the coupling members and means defining a plurality of notches in the outer periphery of the second coupling member and each of which have a length and width with the length being substantially less than the circumference of the second coupling member and which intersect one axial side only of said second coupling member and terminate at their intersection with said one axial side.

2. A fluid coupling of the shear type comprising relatively rotatable coupling members, one of said coupling members defining a fluid working chamber and the other of said coupling members rotatable in said working chamber, said coupling members having opposed spaced surfaces providing a fluid shear space therebetween and cooperable with a fluid shear medium in said shear space to transmit torque between the coupling members, fluid actuating means operable to effect fluid flow into and from the shear space to vary the torque transmitted therebetween, and pumping notch means provided on the outer periphery of said other coupling member and operable to retard said fluid flow into the shear space and including a plurality of notches which intersect one axial face only of the other coupling member and the outer periphery of the other coupling member.

3. A fluid coupling of the shear type comprising relatively rotatable coupling members, one of said coupling members defining a fluid working chamber and the other of said coupling members being rotatable in said working chamber, said coupling members having opposed spaced surfaces providing a fluid shear space therebetween and cooperable with a fluid shear medium in said shear space to transmit torque between the coupling members, fluid actuating means operable to provide for fluid flow into and from the shear space to vary the torque transmitted between the coupling members, and notch means provided on the outer periphery of the other coupling member to retard said fluid flow into the shear space including a plurality of notches intersecting one axial face only of the other coupling member, each of said notches terminating intermediate the axial faces of the other coupling member and having a depth which decreases as the notch extends axially of the other coupling member away from said one axial face.

4. A fluid coupling as defined in claim 3 wherein each of said notches is triangular in transverse section.

5. A fluid coupling as defined in claim 3 wherein said notch means extend at an angle with respect to the direction of rotation of the other coupling member.

6. A fluid coupling as defined in claim 3 wherein said notch means is defined by a pair of surfaces extending from the outer periphery of the other coupling member and intersecting within the outer periphery of the other coupling member.

7. A fluid coupling of the shear type comprising a first coupling member defining a fluid working chamber, a second disk-like coupling member rotatable in the working chamber and having first and second axially spaced surfaces intersected by an outer peripheral surface, said first and second coupling members having parallel opposed spaced surfaces defining a fluid shear space on one axial side of said second coupling member adjacent said first axially spaced surface and cooperable with a fluid shear medium in the shear space to transmit torque therebetween, and pumping notches formed in the edge of said second coupling member at the intersection of said second axially spaced surface and the peripheral surface thereof, said pumping notches intersecting said second axially spaced surface and said peripheral surface and decreasing in depth as they extend from said second axially spaced surfaces.

8. A fluid coupling of the shear type comprising relatively rotatable coupling members, one of said coupling members defining a fluid working chamber and the other of said coupling members being rotatable in said working chamber, said coupling members having opposed spaced surfaces providing a fluid shear space therebetween and cooperable with a fluid shear medium in said shear space to transmit torque between the coupling members, fluid actuating means operable to provide for fluid flow into and from the shear space to vary the torque transmitted between the coupling members, and notch means provided on the outer periphery of the other coupling member to retary fluid flow into the shear space including a plurality of notches intersecting one axial face only of the other coupling member, each of said notches terminating intermediate the axial faces of the other coupling member and having a depth which decreases as the notch extends axially of the other coupling member away from said one axial face, said notch means being defined by a pair of surfaces extending from the outer periphery of the other coupling member and intersecting within the outer periphery of the other coupling member, said surfaces intersecting said one axial face of the other coupling member and converge as they extend axially therefrom.

9. A fluid coupling of the shear type comprising a first coupling member defining a fluid working chamber, a second disk-like coupling member rotatable in the working chamber and having first and second axially spaced surfaces intersected by an outer peripheral surface, said first and second coupling members having parallel opposed spaced surfaces defining a fluid shear space on one axial side of said second coupling member adjacent said first axially spaced surface and cooperable with a fluid shear medium in the shear space to transmit torque therebetween, and pumping notches formed in the edge of said second coupling member at the intersection of said second axially spaced surface and said peripheral surface, said pumping notches intersecting said second axially spaced surface and said peripheral surface and decreasing in depth as they extend from said second axially spaced surface, said notches being non-uniform in transverse dimension and extending at an acute angle to said second axially spaced surface.

References Cited by the Examiner
UNITED STATES PATENTS

| | | | |
|---|---|---|---|
| 2,792,095 | 5/1957 | Sherman | 192—58 |
| 3,007,560 | 11/1961 | Weir | 192—58 |
| 3,101,825 | 8/1963 | Caroli et al. | 192—58 X |

DAVID J. WILLIAMOWSKY, *Primary Examiner.*

DON A. WAITE, *Examiner.*

A. T. McKEON, *Assistant Examiner.*